US011422698B2

(12) United States Patent
Liu et al.

(10) Patent No.: US 11,422,698 B2
(45) Date of Patent: Aug. 23, 2022

(54) METHOD, ELECTRONIC DEVICE, AND COMPUTER PROGRAM PRODUCT FOR STORAGE MANAGEMENT

(71) Applicant: EMC IP Holding Company LLC, Hopkinton, MA (US)

(72) Inventors: Jinpeng Liu, Shanghai (CN); Jin Li, Shanghai (CN); Mengze Liao, Shanghai (CN); Wenbin Yang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 103 days.

(21) Appl. No.: 17/094,430

(22) Filed: Nov. 10, 2020

(65) Prior Publication Data
US 2022/0121362 A1    Apr. 21, 2022

(30) Foreign Application Priority Data
Oct. 15, 2020  (CN) .......................... 202011105937.7

(51) Int. Cl.
*G06F 3/06* (2006.01)
(52) U.S. Cl.
CPC ............ *G06F 3/0604* (2013.01); *G06F 3/067* (2013.01); *G06F 3/0655* (2013.01)
(58) Field of Classification Search
None
See application file for complete search history.

(56) References Cited

U.S. PATENT DOCUMENTS

2005/0177835 A1†  8/2005 Chickering
2006/0092846 A1†  5/2006 Loh et al.
(Continued)

FOREIGN PATENT DOCUMENTS

CN    100405304 C  *  7/2008

OTHER PUBLICATIONS

S. Palaniappan et al., "Efficient Data Transfer through Zero Copy," IBM Developer, https://developer.ibm.com/articles/j-zerocopy/, Sep. 2, 2008, 10 pages.
(Continued)

*Primary Examiner* — Brian R Peugh
(74) *Attorney, Agent, or Firm* — Ryan, Mason & Lewis, LLP

(57) ABSTRACT

Embodiments include a method, an electronic device, and a computer program product for storage management. According to one embodiment of the present disclosure, a method for storage management includes: determining at a kernel of a storage server whether a first system call related to a target file is initiated by a thread executed in the storage server, wherein the target file is a file targeted by an accessing operation executed by a client terminal with respect to a storage device; determining a first connection and a second connection that are associated with the target file if the first system call is initiated, wherein the first connection is a connection between the client terminal and the storage server, and the second connection is a connection between the storage server and the storage device; and causing the client terminal to access the target file via the first connection and the second connection.

20 Claims, 9 Drawing Sheets

(56) References Cited

U.S. PATENT DOCUMENTS

2011/0219122 A1\* 9/2011 Mahajan ................. G06F 15/16
709/227
2013/0070844 A1\* 3/2013 Malladi ................ H04N 19/136
348/E7.003

OTHER PUBLICATIONS

A. Bijlani et al., "Extension Framework for File Systems in User Space," Proceedings of the 2019 USENIX Annual Technical Conference, Jul. 10-12, 2019, Renton, Washington, USA, 15 pages.
NVM Express, "NVM Express over Fabrics," http://nvmexpress.org, Revision 1.0, Jun. 5, 2016, 49 pages.

\* cited by examiner
† cited by third party

METHOD, ELECTRONIC DEVICE, AND COMPUTER PROGRAM PRODUCT FOR STORAGE MANAGEMENT

RELATED APPLICATION(S)

The present application claims priority to Chinese Patent Application No. 202011105937.7, filed Oct. 15, 2020, and entitled "Method, Electronic Device, and Computer Program Product for Storage Management," which is incorporated by reference herein in its entirety.

FIELD

Embodiments of the present disclosure relate generally to storage management, and in particular, to a method, an electronic device, and a computer program product for storage management.

BACKGROUND

With the development of information technologies, more and more data are stored in a storage system, leading to higher and higher requirements for the access performance of the storage system. In addition, with respect to local storage systems, network-based storage systems have emerged, such as NVMEoF (Non-Volatile Memory Express over Fabrics) storage systems and SAN (Storage Area Network) storage systems. A network-based storage system allows more storage devices to be connected to a storage server by using network connections instead of local bus connections (for example, PCIe (Peripheral Component Interface Express) bus connections), without being limited by the number of connection slots of physical local buses. However, when data is accessed, context switches of data between a user space and a kernel space will occur in the network-based storage system, which will result in a decrease in the access performance of the storage system.

SUMMARY

Embodiments of the present disclosure provide a method, an electronic device, and a computer program product for storage management.

In a first aspect of the present disclosure, a method for storage management is provided. This method includes: determining at a kernel of a storage server whether a first system call related to a target file is initiated by a thread executed in the storage server, wherein the target file is a file targeted by an accessing operation executed by a client terminal with respect to a storage device; determining a first connection and a second connection that are associated with the target file if the first system call is initiated, wherein the first connection is a connection between the client terminal and the storage server, and the second connection is a connection between the storage server and the storage device; and causing the client terminal to access the target file via the first connection and the second connection.

In a second aspect of the present disclosure, an electronic device is provided. The device includes at least one processing unit and at least one memory. The at least one memory is coupled to the at least one processing unit and stores instructions for execution by the at least one processing unit. The instructions, when executed by the at least one processing unit, cause the device to perform actions including: determining at a kernel of a storage server whether a first system call related to a target file is initiated by a thread executed in the storage server, wherein the target file is a file targeted by an accessing operation executed by a client terminal with respect to a storage device; determining a first connection and a second connection that are associated with the target file if the first system call is initiated, wherein the first connection is a connection between the client terminal and the storage server, and the second connection is a connection between the storage server and the storage device; and causing the client terminal to access the target file via the first connection and the second connection.

In a third aspect of the present disclosure, a computer program product is provided. The computer program product is tangibly stored on a non-transitory computer-readable medium and includes machine-executable instructions, wherein the machine-executable instructions, when executed, cause a machine to implement any step of the method described according to the first aspect of the present disclosure.

This Summary is provided in order to introduce the selection of concepts in a simplified form, which will be further described in the Detailed Description below. The Summary is not intended to identify key features or essential features of the present disclosure, nor is it intended to limit the scope of the present disclosure.

BRIEF DESCRIPTION OF THE DRAWINGS

The above and other objectives, features, and advantages of the present disclosure will become more apparent from the Detailed Description below of example embodiments of the present disclosure, to be viewed in combination with the accompanying drawings. In the example embodiments of the present disclosure, the same reference numerals generally represent the same parts.

The same or corresponding reference numerals in the various drawings represent the same or corresponding portions.

DETAILED DESCRIPTION

Figure 1:
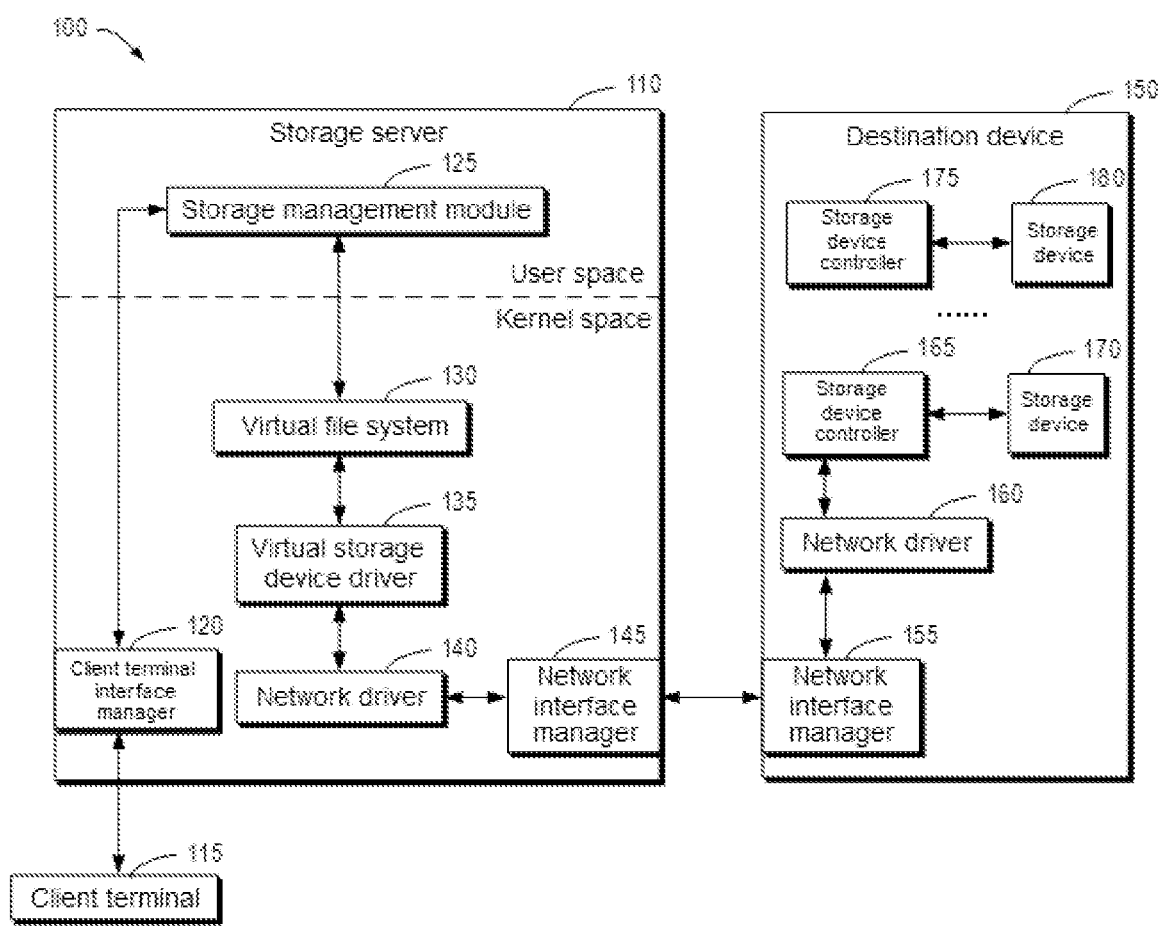
FIG. 1 illustrates a schematic diagram of an example of a conventional storage system.

Hereinafter, illustrative embodiments of the present disclosure will be described in more detail with reference to the accompanying drawings. Although illustrative embodiments of the present disclosure are shown in the drawings, it should be understood that the present disclosure can be implemented in various forms and should not be limited by the embodiments set forth herein. Rather, these embodiments are provided so that this disclosure will be more thorough and complete, and will fully convey the scope of the present disclosure to those skilled in the art.

As used herein, the term "including" and variations thereof mean open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," etc., may refer to different or the same objects. Other explicit and implicit definitions may also be included below.

As mentioned above, when data is accessed, context switches of data between a user space and a kernel space will occur in a conventional network-based storage system. Hereinafter, such context switch will be described in detail in combination with FIG. 1.

FIG. 1 illustrates a schematic diagram of an example of conventional storage system 100. Storage system 100 may be a network-based storage system, such as an NVMEoF storage system and a SAN storage system. Storage system 100 includes storage server 110 and destination device 150. In a conventional data accessing process, client terminal 115 may send to storage server 110 a request for accessing (for example, reading/writing) a target file. Client terminal interface manager 120 (for example, a client terminal access LAN interface card) in storage server 110 may receive the reading/writing request, and send the reading/writing request to storage management module 125 in the user space that is used for managing storage server 110.

Storage management module 125 may analyze the reading/writing request, and find the target file by searching for metadata of the target file. In some embodiments, storage management module 125 may also update the metadata, and synchronize, by direct writing, the updated metadata to a storage device, for example, storage device 170 or 180.

Storage management module 125 may send to virtual file system 130 in the kernel space a system call for reading/writing the target file. Virtual file system 130 may convert the system call into a virtual storage device reading/writing command, and send the reading/writing command to virtual storage device driver 135. Virtual storage device driver 135 may encapsulate the reading/writing command into a sending/receiving command that conforms to a network protocol (such as the RDMA (Remote Direct Memory Access) protocol and the TCP/IP protocol), and low-layer network driver 140 may put the sending/receiving command into a queue to be processed, so that the sending/receiving command can be sent to destination device 150 by network interface manager 145 (such as an RDMA network interface card and a TCP/IP network interface card) via the network.

Network interface manager 155 of destination device 150 may receive the sending/receiving command. Network driver 160 may extract the reading/writing command from the sending/receiving command, and send the extracted reading/writing command to a storage device controller of the storage device where the target file is stored, for example, storage device controller 165 of storage device 170, or storage device controller 175 of storage device 180. Storage device controller 165 may execute the reading/writing command with respect to storage device 170. It should be understood that although FIG. 1 only illustrates two storage device controllers and corresponding storage devices controlled by them, destination device 150 may have more or fewer storage device controllers and corresponding storage devices controlled by them. Then, destination device 150 may send a reply (for example, the reply may include the read target file or confirmation of the writing of the target file) back to storage server 110 and client terminal 115 in an opposite manner (the description is omitted here).

Generally, destination device 150 is implemented by efficient and domain-specific hardware. However, storage server 110 usually performs storage management through software, which becomes a bottleneck of storage system 100. Hereinafter, the reason for the bottleneck will be described in combination with FIG. 2.

Figure 2:
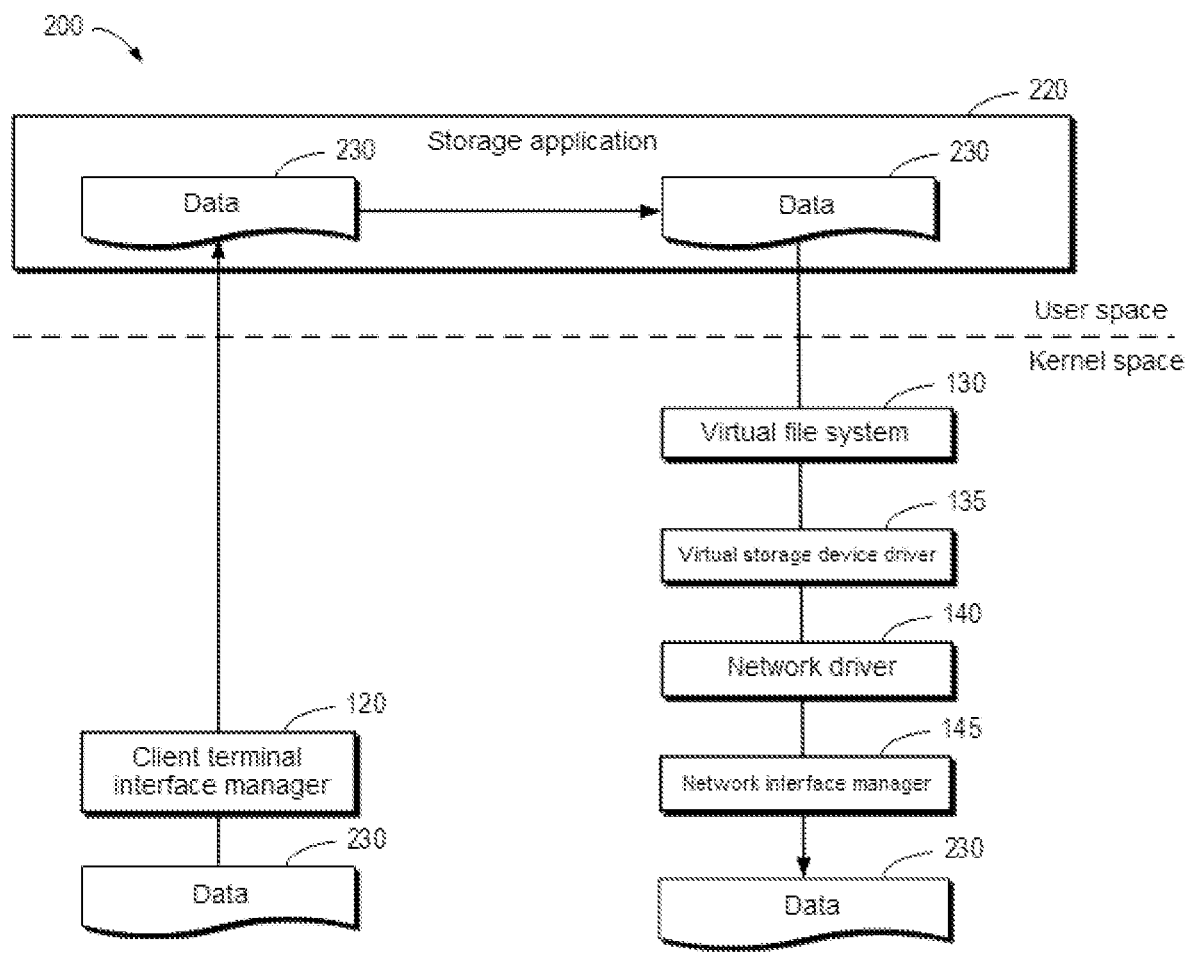
FIG. 2 illustrates a schematic diagram of an example of a data stream in a conventional storage server.

FIG. 2 illustrates a schematic diagram of an example of a data stream 200 in conventional storage server 110. As shown in FIG. 2, in order to move data 230 from client terminal interface manager 120 to network interface manager 145, data 230 needs to reach storage application 220 in the user space from client terminal interface manager 120 through the kernel space, and then reach network interface manager 145 from storage application 220 in the user space through the kernel space (through virtual file system 130, virtual storage device driver 135, and network driver 140).

In this process, for each piece of data 230, there are two context switches and two data copies between the user space and the kernel space. This will increase the cost and significantly reduce the performance of the storage system.

Figure 3:
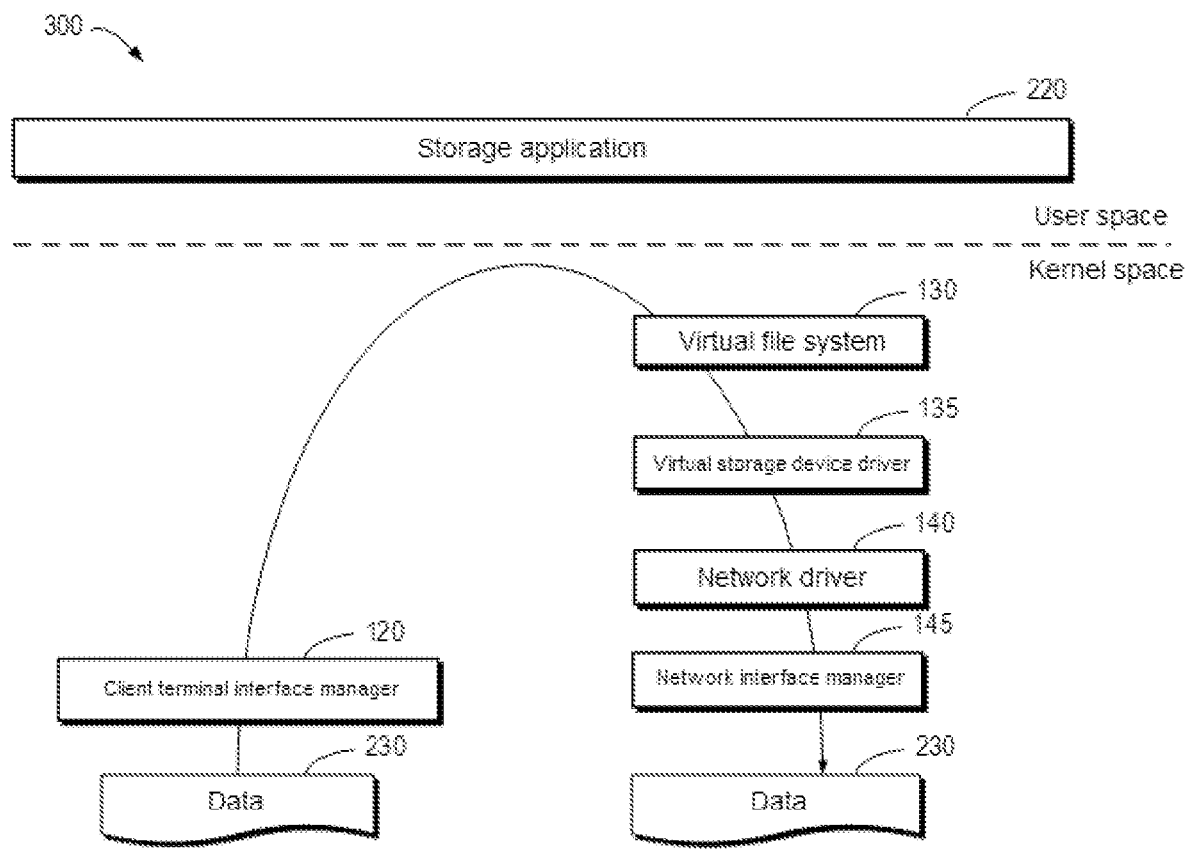
FIG. 3 illustrates a schematic diagram of an example of an ideal data stream.

FIG. 3 illustrates a schematic diagram of an example of an ideal data stream 300. As shown in FIG. 3, in the process of moving data 230 from client terminal interface manager 120 to network interface manager 145, the data only goes through the kernel space without entering the user space. In this case, for each piece of data 230, two context switches and two data copies between the user space and the kernel space are avoided.

According to an example embodiment of the present disclosure, an improved solution for storage management is provided. This solution includes: determining at a kernel of a storage server whether a first system call related to a target file is initiated by a thread executed in the storage server, wherein the target file is a file targeted by an accessing operation executed by a client terminal with respect to a storage device; determining a first connection and a second connection that are associated with the target file if the first system call is initiated, wherein the first connection is a connection between the client terminal and the storage server, and the second connection is a connection between the storage server and the storage device; and causing the client terminal to access the target file via the first connection and the second connection.

In this way, in this solution, since all data copies are in the kernel space, the extra overhead of data copies in the user space and the context switches between the kernel space and the user space can be avoided.

Figure 5:
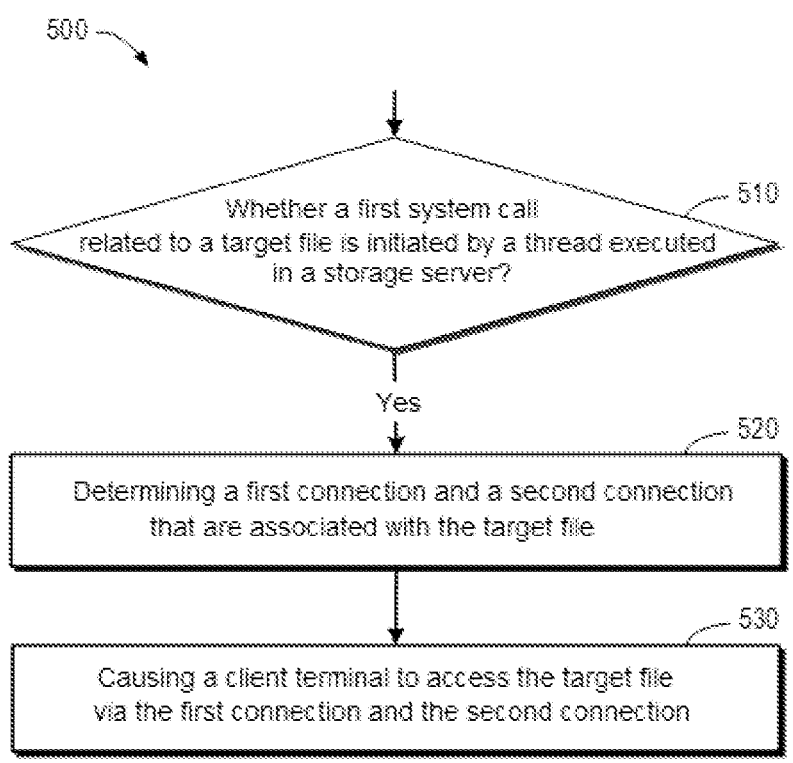
FIG. 5 illustrates a flowchart of an example of a method for storage management according to some embodiments of the present disclosure.
Figure 6:
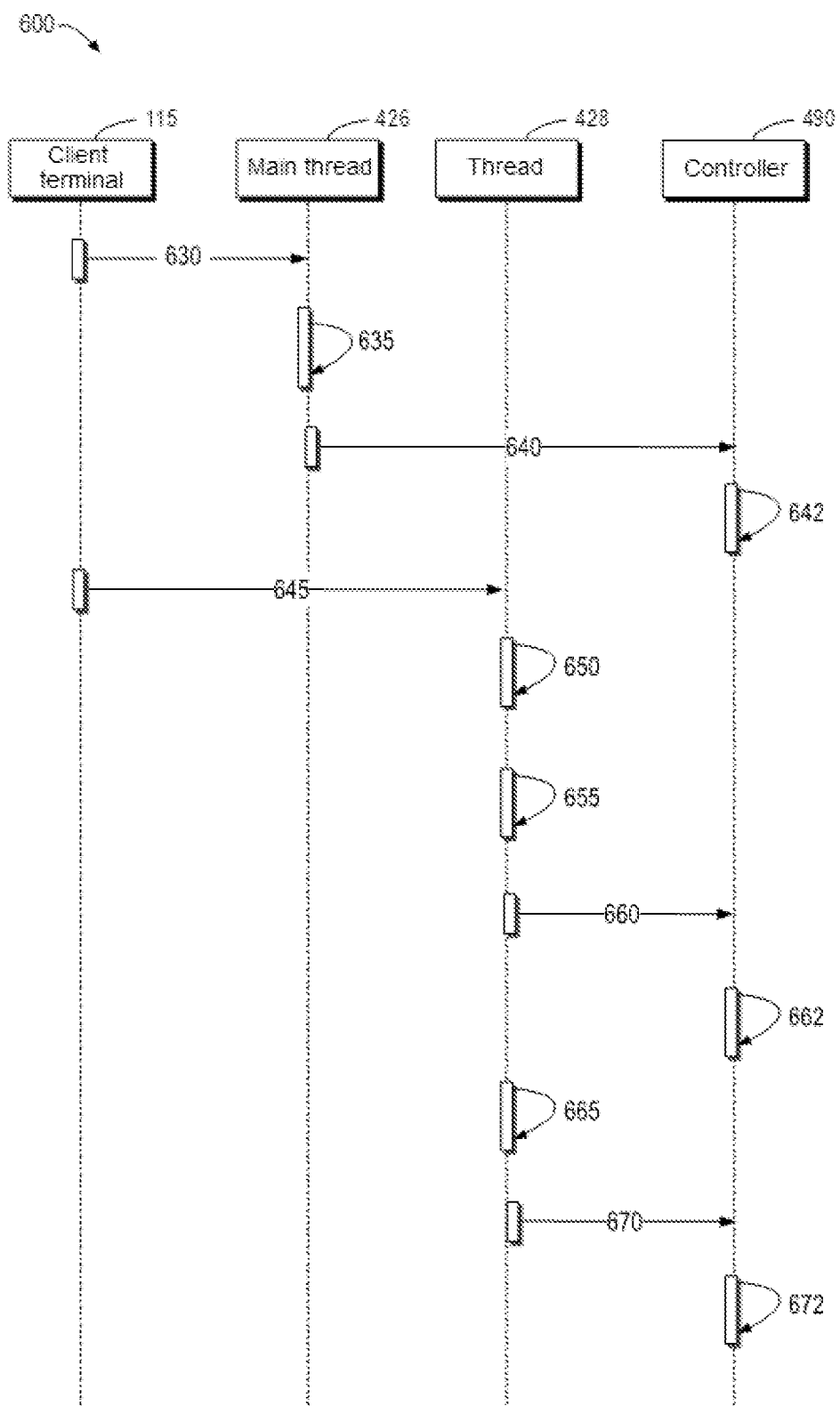
FIG. 6 illustrates a diagram of an example of a process for data accessing according to some embodiments of the present disclosure.
Figure 7:
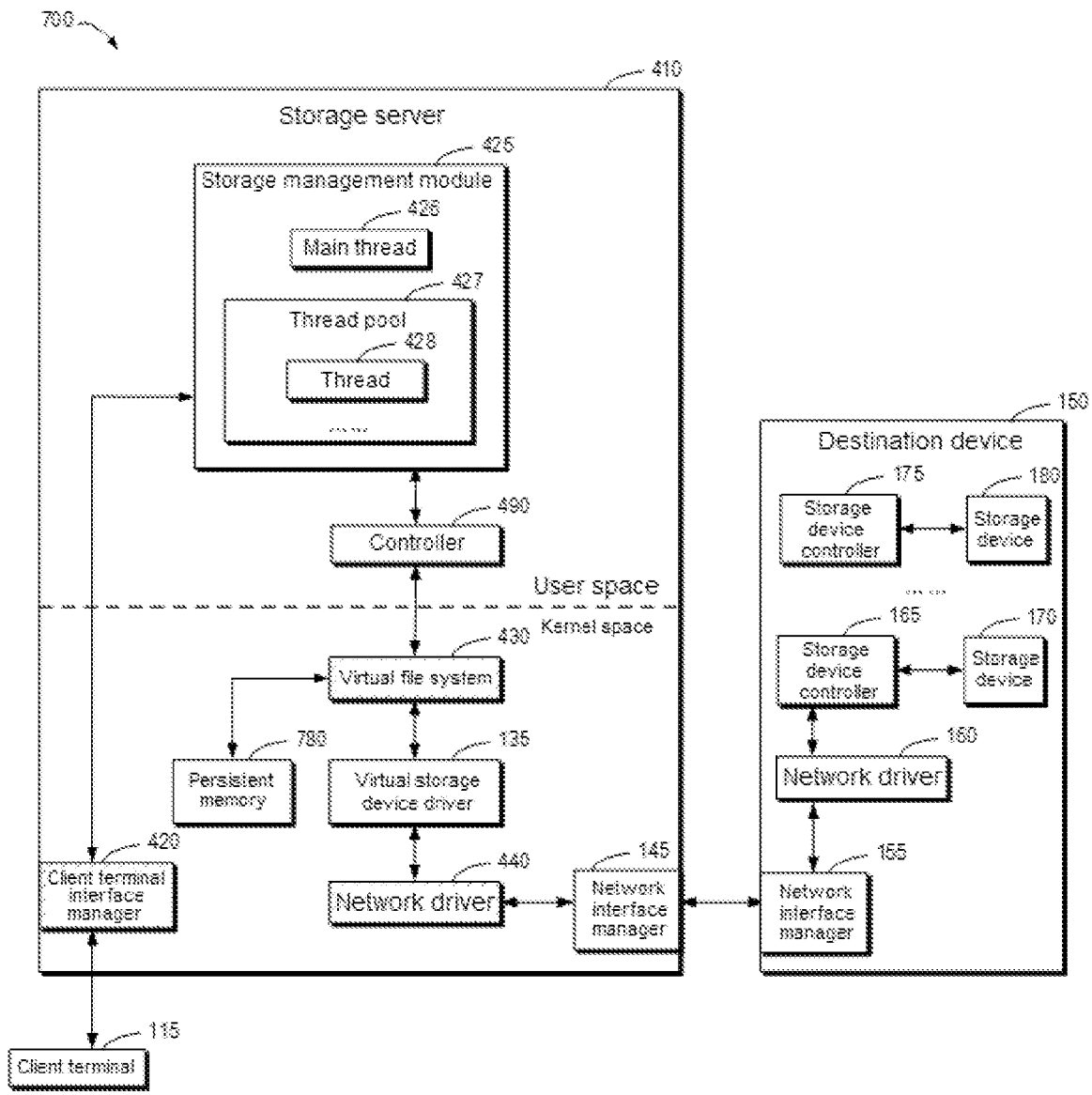
FIG. 7 illustrates a schematic diagram of an example of a storage system using a persistent memory according to some embodiments of the present disclosure.
Figure 8:
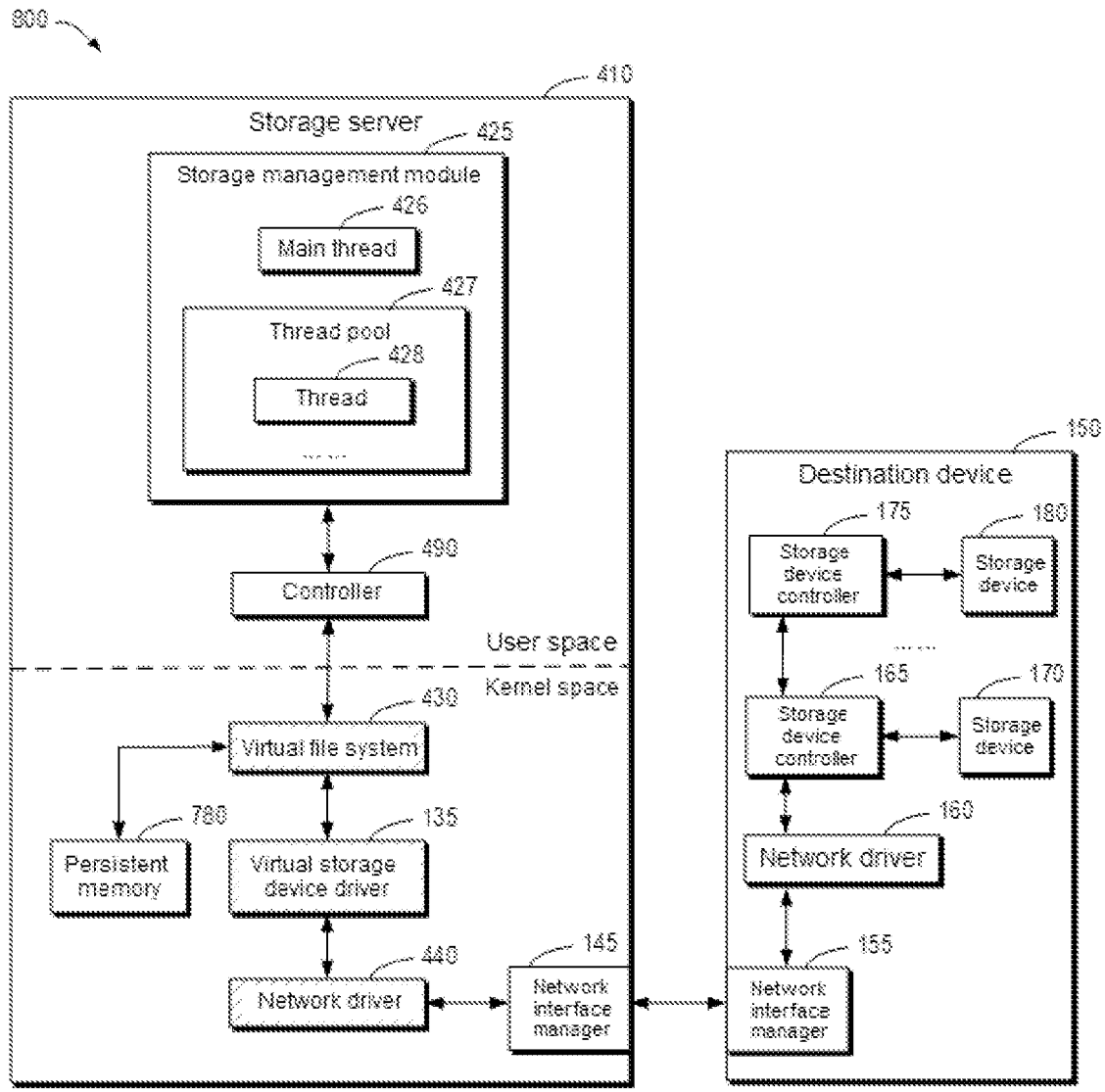
FIG. 8 illustrates a schematic diagram of an example of a process for data movement according to some embodiments of the present disclosure.

Hereinafter, specific examples of this solution will be described in combination with FIGS. 3 to 8, where FIGS. 3 to 6 are associated with application data, FIG. 7 is associated with metadata, and FIG. 8 is associated with data movement.

Application Data

Figure 4:
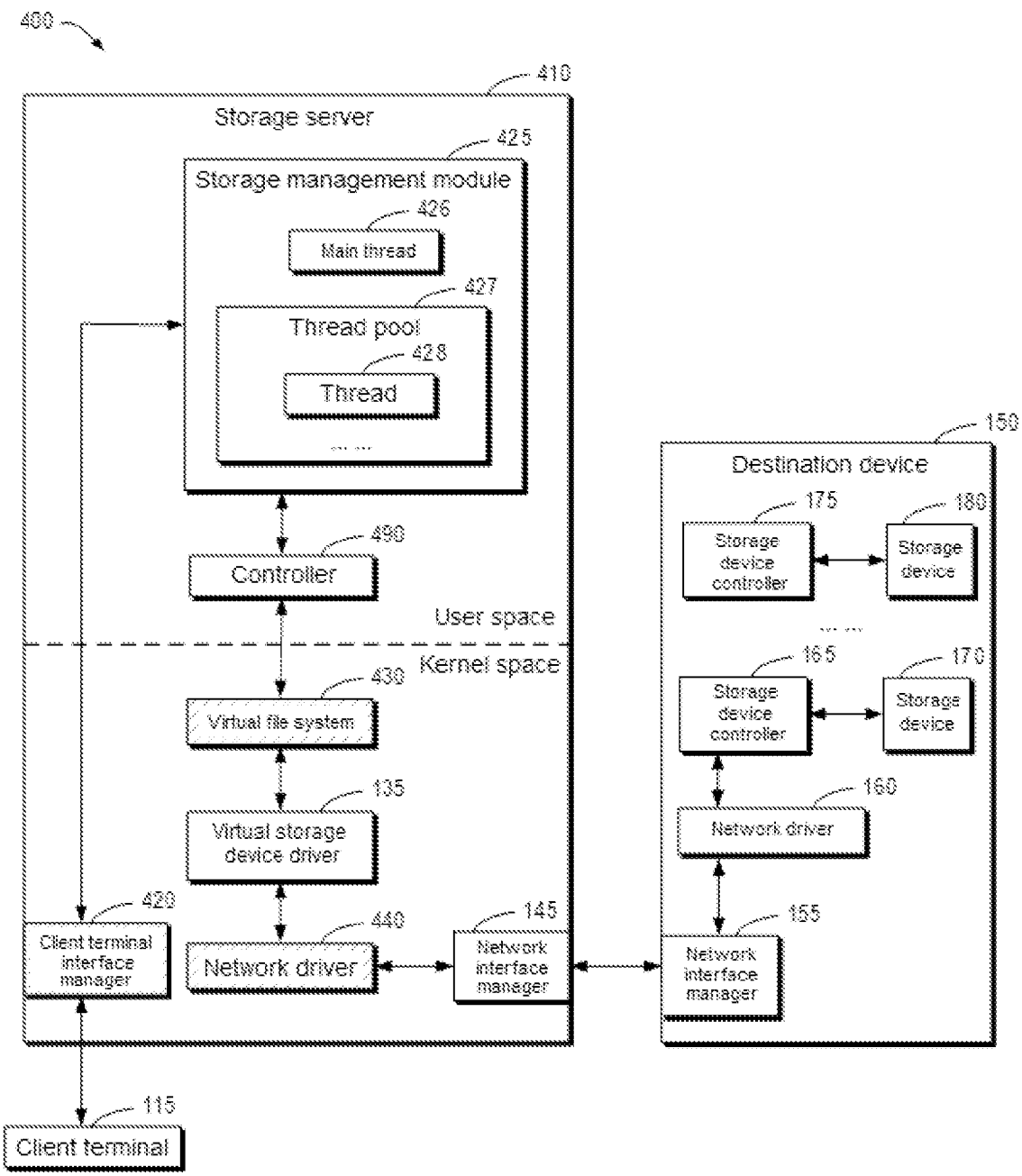
FIG. 4 illustrates a schematic diagram of an example of a storage system in which some embodiments of the present disclosure can be implemented.

FIG. 4 illustrates a schematic diagram of an example of storage system 400 in which some embodiments of the present disclosure can be implemented. Compared with storage system 100 in FIG. 1, storage server 410 includes controller 490. Controller 490 may associate (this may be interchangeably referred to as "hook") various operations with kernel functions in the kernel space. For example, controller 490 may hook various operations with the kernel functions for client terminal interface manager 420, virtual file system 430, and network driver 440 to coordinate the entire data stream in the kernel space, thereby reducing data copies in the user space and context switches between the kernel space and the user space. In some embodiments, a user may write code for various operations. The compiled code may be hooked to kernel functions through system calls, and operations for hooking to the kernel functions will be executed in a virtual machine in the kernel space when the kernel functions are being executed. In order to ensure the security of the kernel, before these operations are performed, it can be verified in advance whether these operations will damage the kernel, such as whether they will enter an infinite loop.

In addition, storage management module 425 of storage server 410 may also have main thread 426 for managing storage server 410 and thread pool 427 including multiple idle threads. One thread may be selected from these idle threads as a working thread to process a data accessing request from client terminal 115. It should be understood that although FIG. 4 only shows thread 428, thread pool 427 may have more or fewer threads.

Further, a mapping table may also be used to coordinate operations associated with data accessing. In some embodiments, the mapping table may be a key-value table, the key of which is an identifier (for example, PID (Process Identification)) of the selected working thread, and the value may include various information such as an identifier of the connection between client terminal 115 and storage server 410, an identifier (for example, a descriptor and/or a file name) of the target file, and an identifier of the connection between storage server 410 and destination device 150 (and thus a storage device in destination device 150). In addition, when a new file is opened for reading or writing or the file is closed, the mapping table may also be dynamically updated.

As an example, controller 490 may be implemented by an enhanced ExtFUSE (Extended Filesystem in Userspace). However, the enhanced ExtFUSE is only an example, and controller 490 may be implemented in any appropriate manner. In order to understand the enhanced ExtFUSE, FUSE (Filesystem in Userspace) will be first introduced. FUSE is an interface for user space programs to export file systems to the Linux kernel. However, even if FUSE is a user space file system, there are still context switches for each file system call. ExtFUSE is implemented based on FUSE, but it provides extensions by registering some hooks in system calls in the kernel space to improve the performance during file I/O (Input/Output).

The hooks may be implemented through the eBPF (Extended Berkeley Packet Filter) mechanism. Initially, BPF is a dedicated virtual machine (a register-based filter evaluator) used to filter network packets, while eBPF, which extends BPF, has become a general kernel extension framework, and may hook various kernel functions. eBPF is a virtual machine of the Linux kernel, which may perform advanced and low-cost tracking inside the kernel to gain insight into I/O and file system delays, CPU (Central Processing Unit) usage of the process, stack tracking, and other indexes for debugging. eBPF may also play a role in system security, which potentially provides a method for preventing DDOS (Distributed Denial Of Service) attacks, monitoring intrusion detection, and even replacing IP tables as a method for implementing firewalls. eBPF may also be used to install drivers.

In this way, storage system 400 may make the processing logic closer to the data in the kernel space, so that application data may be processed efficiently in the kernel space, thus avoiding data copying in the user space and context switches between the user space and the kernel space.

FIG. 5 illustrates a flowchart of an example of method 500 for storage management according to some embodiments of the present disclosure. For example, method 500 may be executed by controller 490 as shown in FIG. 4. Note that although controller 490 is shown as being in the user space, preset operations hooked to the system calls and executed by controller 490 are all executed in the kernel space. It should be understood that method 500 may further include additional steps not shown and/or may omit the shown steps, and the scope of the present disclosure is not limited in this respect.

At 510, controller 490 determines, at a kernel (interchangeably referred to as "kernel space") of storage server 410, whether a first system call related to a target file (for example, application data) is initiated by a thread executed in storage server 410. The target file is a file targeted by an accessing operation executed by client terminal 115 with respect to a storage device (for example, storage device 170).

At 520, if the first system call (e.g., a system call for accessing (reading/writing) the target file) is initiated, controller 490 determines a first connection and a second connection that are associated with the target file. The first connection is a connection between client terminal 115 and storage server 410, and the second connection is a connection between storage server 410 and destination device 150 (and thus a storage device in destination device 150). At 530, controller 490 causes client terminal 115 to access the target file via the first connection and the second connection. The detailed data accessing process will be described in combination with FIG. 6.

FIG. 6 illustrates a diagram of an example of process 600 for data accessing according to some embodiments of the present disclosure. Client terminal 115 may send 630 to storage server 410 a request for establishing the first connection. As described above, the first connection is the connection between client terminal 115 and storage server 410. After receiving, via client terminal interface manager 420, the request for establishing the first connection, storage server 410 may accept the request.

In this case, main thread 426 for managing storage server 410 may select 635 one idle thread (for example, thread 428) from multiple idle threads as the working thread and start thread 428. In some embodiments, main thread 426 may use, via a second system call (e.g., a system call for creating a thread), the identifier (e.g., the descriptor) of the first connection to start thread 428.

Controller 490 may determine 640 whether the second system call related to starting thread 428 is initiated by main thread 426. If the second system call is initiated, since the kernel function associated with the second system call has been hooked to a preset operation, controller 490 may perform the preset operation. Specifically, controller 490 may store 642 the identifier of the first connection and the identifier (for example, the descriptor) of thread 428 into a storage region of the kernel. In some embodiments, the storage region may be a mapping table for coordinating operations associated with data accessing.

Subsequently, client terminal 115 may send 645 to storage server 410 a request for accessing the target file. The request for accessing the target file may include various information associated with the target file, for example, an identifier of the target file, a size of the target file, and a position of the target file (for example, an offset of the storage position).

Since the request from client terminal 115 for accessing the target file is transmitted via the first connection, thread 428 in storage server 410 will be responsible for processing the request. In some embodiments, thread 428 may search 650 for metadata of the target file and open 655 the target file. In some embodiments, thread 428 may use a third system call (for example, a system call for opening a file) to open in virtual file system 430 the target file on virtual storage device driver 135.

Controller 490 may determine 660 whether the third system call related to opening the target file is initiated by thread 428. If the third system call is initiated, since the kernel function associated with the third system call has been hooked to a preset operation, controller 490 may perform the preset operation. Specifically, controller 490 may store 662 the identifier (for example, the descriptor) of the target file into the storage region of the kernel.

Then, thread 428 may initiate 665 a first system call (e.g., a system call for accessing (reading/writing) the target file) related to the target file. In some embodiments, thread 428 may use various information (for example, the identifier of the target file, the size of the target file, and/or the position of the target file) associated with the target file to initiate the first system call.

Controller 490 may determine 670 whether the first system call is initiated by thread 428. If the first system call is initiated, since the kernel function associated with the first system call has been hooked to a preset operation, controller 490 may perform 672 the preset operation. Specifically, controller 490 may determine an identifier of the second connection based on the first system call and store the identifier (for example, the descriptor) of the second connection into the storage region of the kernel. Subsequently, controller 490 may determine the first connection and the second connection based on the identifier of the first connection and the identifier of the second connection that are stored in the storage region.

In this way, controller 490 may cause client terminal 115 to access the target file via the first connection and the second connection. For example, in a case where the accessing request is a reading request, controller 490 may determine whether the target file is received from the storage device via the second connection. If the target file is received, controller 490 may send the target file to client terminal 115 via the first connection.

Specifically, the first system call will reach virtual storage device driver 135 through a virtual storage device reading command, and the virtual storage device reading command will be sent to low-layer network driver 440, thereby establishing the second connection to send the virtual storage device reading command to destination device 150. After destination device 150 executes the virtual storage device reading command, the read target file will be sent back to network driver 440 in storage server 410 via the second connection. The kernel function associated with the receipt of the target file by network driver 440 has been hooked to a preset operation so as to extract the target file from the received packet and send it to client terminal 115 via the first connection.

In addition, in a case where the accessing request is a writing request, controller 490 may determine whether the target file is received from client terminal 115 via the first connection. If the target file is received, controller 490 may send the target file to destination device 150 (and thus a storage device in destination device 150) via the second connection.

Generally, client terminal 115 will send both the reading request and the writing request to storage server 410, and client terminal 115 will not access only one single file. To this end, the operations described above respectively for the reading request and the writing request may be used to process mixed requests. For example, it is possible to mix the processing for the reading request and the writing request, close an old file or open a new file, and delete related information from the storage region or add it to the storage region, thereby realizing these mixed requests.

After client terminal 115 completes the accessing request, client terminal 115 may close the connections, for example, closing the first connection and the second connection. Thread 428 in storage server 410 may also call a closing system call. The kernel function associated with the closing system call has been hooked to a preset operation to delete information for the first connection and the second connection from the storage region.

In some embodiments, before performing the aforementioned data accessing operations, storage system 400 may also be initialized in advance. For example, after restarting or starting storage system 400 for the first time, storage system 400 may be initialized as follows. Storage system 400 may read configuration information to determine client terminal interface manager 420 and network interface manager 145, and set a flag to indicate whether direct access is allowed between client terminal interface manager 420 and network interface manager. Storage system 400 may also start controller 490 (if it has not been started). Then, controller 490 may hook the aforementioned various system calls with preset operations. Alternatively, if direct access is allowed, controller 490 may also hook sending/receiving queues of client terminal interface manager 420 and network driver 440 with preset operations. Then, storage system 400 may call socket, binding, and listening functions to wait for requests of client terminal 115, while these system calls are not hooked to preset operations.

In this way, in this solution, since preset operations hooked to kernel functions are all executed in the kernel space, all data copies are in the kernel space, so that the extra overhead of data copies in the user space and the context switches between the kernel space and the user space can be avoided.

Metadata

The near-kernel processing of application data in a storage system is described above, and the near-kernel processing of metadata in a storage system will be described below. In a storage system, it is not enough to only process application data efficiently, metadata also needs to be processed efficiently.

However, conventional storage systems have two problems regarding efficiency. On the one hand, the storage system needs to update the metadata from time to time, and needs to synchronize the updated metadata from a memory (for example, a main memory) to a storage device (for example, a backup file system) using a direct writing method. In the direct writing method, even if only a single byte is updated, the entire storage block (for example, 4 KB in size) needs to be moved to the storage device, which is very inefficient.

On the other hand, when the storage system is restarted, the metadata needs to be read from the storage device back to the memory. Due to differences in storage formats between the memory and the storage device, the metadata needs to be reconstructed, which will take a long time.

In order to solve at least the above problems, a Persistent Memory (PM) may be used to store the metadata. FIG. 7 illustrates a schematic diagram of an example of storage system 700 using a persistent memory, in which some embodiments of the present disclosure can be implemented.

In storage system 700, controller 490 may be made into a file system perceived by persistent memory 780. The structure of metadata may be aligned during a cold restart. In addition, operations on the metadata may be automatically hooked to kernel functions to achieve the near-kernel processing of the metadata.

The size and access speed of the persistent memory may fill the gap between the memory (for example, using DRAM) and the storage device (for example, using NVME). The persistent memory may provide two sets of access interfaces as block storage devices or as random access memory regions. However, in the file system perceived by the persistent memory, an application may adopt a Direct Access (DAX) mode to access a file hosted in the persistent memory (in this case, the persistent memory is used as a block storage device), and then memory mapping is performed on the content of the file to map it to the memory space of the application. Then, the application may use the memory application programming interface (API) to access the memory-mapped file as if the persistent memory is a region of the memory without a page cache for file system access. In other words, the application may directly access the file as if the file is already in the memory. Therefore, this mode is also referred to as direct access mode.

The purposes of using a persistent memory and the direct access mode to store metadata are as follows: on the one hand, when updating metadata, compared with accessing a storage device, accessing a persistent memory is faster, and there is no need to use the direct writing method; and on the other hand, when reading a file and mapping it to a memory, the metadata may be used directly in an application without reading the content of the file from the storage device and rebuilding the metadata.

When the storage system is started or restarted, it may open a file containing the metadata, and then map the content of the file to the persistent memory. Then, various operations hooked to kernel functions may access the metadata.

In addition, as described above, controller 490 may be made into a file system perceived by persistent memory 780, so that the metadata may be accessed using the direct access mode. However, there is still another problem: in the direct access mode, during a cold restart, if the metadata is mapped to a memory address different from that of the last mapping, the value of a pointer that points to the address of the last mapping of the metadata will be incorrect. For example, the pointer value of the previous mapping of the metadata is "0x8080aa00," and the pointer value of the next mapping of the metadata is "0x80800000." However, the metadata is remapped to the memory during the cold restart, and its value is still "0x8080aa00," which will cause the system to crash, and will even destroy other data structures.

For this, there are three solutions. In the first solution, when performing memory mapping on the metadata, the address may be set to a fixed value, so that the metadata may be mapped to the same address every time. However, if the address is already occupied, this solution cannot guarantee success. In the second solution, instead of the absolute value of the address, an offset of the address may be used. For example, it can be realized by the syntax extension function provided by Microsoft C++. However, there may be portability problems with this solution. In the third solution, metadata can be defined as objects (for example, using the NVML libmemobj library), which can then be accessed using macros or functions. These macros or functions will process the conversion between the offset of the address and the absolute value of the address.

In this way, if controller 490 determines that client terminal 115 accesses the target file via the first connection and the second connection, controller 490 may update the metadata, which is associated with the target file, in the persistent memory. Metadata may include various information associated with the target file. For example, the metadata may include the identifier of the client terminal, the time when the target file is accessed, the identifier of the target file, the size of the target file, the position of the target file, and/or an index node for retrieving the target file.

This can be implemented by hooking the kernel functions associated with accessing the target file to preset operations for updating the metadata. For example, if the accessing request is for accessing a new file, one piece of new metadata is created. If the accessing request is for accessing an existing file, the existing metadata is updated.

Since various information related to the access (for example, the initiator, the time stamp, etc.) and the file (the directory, the file name, the index node, the size, etc.) can be acquired directly or indirectly, the metadata can be automatically maintained. For example, the file name and index node may be acquired indirectly from the associated file descriptor. In addition, since all the processing is in the kernel space, the metadata may be processed in the kernel space in a similar manner to the processing of application data, without the need for additional metadata copies and context switches between the kernel space and the user space.

In this way, in this solution, the persistent memory may be used as a block storage medium, so that there is no need to persistently store the updates and reconstructions of the metadata in a direct writing mode after the cold restart. In addition, controller 490 may be extended to a file system perceived by the persistent memory, so that the metadata can be accessed using the direct access mode. In addition, the metadata may be defined as an object so that it can be accessed using macros or functions. Such a metadata management method may still effectively use the pointer of the persistently stored metadata after a cold restart. Further, by hooking preset operations to kernel functions associated with accessing the target file, the metadata can be automatically maintained in the kernel space every time an access of application data occurs, so that both the application data and the metadata are processed in the kernel space, thereby improving the access performance.

Data Movement

The processing for the application data and the metadata is described above, and how to move these data will be described in detail below.

Currently, during the moving (e.g., copy-on-write, snapshot, clone) of data from one storage device (e.g., storage device 170) in destination device 150 to another storage device (e.g., storage device 180), the storage system needs to first copy the data from remote storage device 170 back to the user space, and then write the data to the other remote storage device 180. Data receiving/sending and user space/kernel space context switches will consume a lot of resources, for example, CPU cycles. In addition, due to the great speed of the storage device (for example, an NVMe storage device) and the network transmission (for example, conforming to the RDMA protocol), the problems caused by context switching will be more serious.

For example, with the rapid development of NVMe storage devices, more and more storage systems use them as basic storage media. In addition, with the substantial increase in PCIe bandwidth and the development of RDMA network interface cards, connecting storage servers with NVMe storage devices through RDMA network interface cards has become a popular and efficient topology. This NVMeoF technology greatly improves the capacity and density of a single storage system without being limited by the number of PCIe slots on the motherboard and consequently the heat dissipation issues. At the same time, the NVMeoF technology provides great flexibility for hardware design and deployment.

However, due to the large capacity and high density, storage system software needs to process more and more I/O requests from/to a large number of NVMe storage devices. In addition to conventional SCSI (Small Computer System Interface) storage drivers, how to efficiently process the massive increase in I/O requests becomes important. However, a data movement operation (for example, copy-on-write, snapshot, clone) triggered from the management path in the storage system will create bursts of a large number of I/O requests and consume most of the system resources, which in particular will cause CPU usage peaks and also affect I/O on the data path. Therefore, freeing the CPU from such non-computational intensive operations will significantly improve the performance of the entire storage system.

For this reason, in this solution, near-kernel data movement can be realized. FIG. 8 illustrates a schematic diagram of an example of process 800 for data movement according to some embodiments of the present disclosure. In order to realize near-kernel data movement, the storage system can be initialized first. In some embodiments, during the initialization process, if controller 490 has not been started, the storage system may start controller 490. Controller 490 may hook a preset operation with a system call for virtual file system 430 for use to manage data movement. In addition, controller 490 may also hook preset operations with a reading completion queue and a writing completion queue of virtual storage device driver 135 and network driver 440.

The process of data movement will be described below. In some embodiments, it is assumed that the target file to be moved is stored in storage device 170, and the storage device includes multiple storage blocks. In this case, controller 490 may determine whether a fourth system call (for example, a system call for moving the target file) related to moving the target file from storage device 170 to another storage device (for example, storage device 180) is initiated. The fourth system call includes various information related to the movement of the target file, such as a type of movement (for example, copying or migration), an identifier of the storage device, positions of storage blocks in the first group of storage blocks, an identifier of the other storage device, positions of storage blocks in the second group of storage blocks, and/or the size of the target file.

If it is determined that the fourth system call is initiated, controller 490 may read the target file from the first group of storage blocks in storage device 170 that are used for storing the target file, and move the target file to the second group of storage blocks in another storage device 180.

In addition, a source-destination mapping table of metadata for data movement transactions can also be created and managed in persistent memory 780. Since this mapping table is stored in persistent memory 780, the data movement transactions can be resumed after power failure.

To this end, controller 490 may generate a set of records associated with the target file. The set of records can be stored in, for example, a source-destination mapping table. Each record in the set of records includes: the position of a first storage block in the first group of storage blocks, the position of a second storage block corresponding to the first storage block and in the second group of storage blocks, and/or a movement state indicator.

The movement state indicator may indicate the movement state of the target file. For example, when a part of the target file on the first storage block has not been moved to the second storage block, the movement state indicator may indicate that it has not been moved; whereas if the part of the target file on the first storage block has been moved to the second storage block, controller 490 may change the movement state indicator to one indicating that the part of the target file on the first storage block has been moved to the second storage block. Further, after the target file is moved to the second group of storage blocks, controller 490 may also release the first group of storage blocks.

Specifically, controller 490 uses the migration or copy command and various parameters (for example, an identifier of the storage device, positions of storage blocks in the first group of storage blocks, an identifier of another storage device, positions of storage blocks in the second group of storage blocks, and/or the size of the target file) to call the fourth system call.

Since the fourth system call is hooked to a preset operation, controller 490 will create a set of records to indicate that all storage blocks have not been moved. In addition, controller 490 will also construct a reading I/O request and send it to virtual storage device driver 135 to read the target file according to the positions of the storage blocks in the first group of storage blocks.

Then, since the completion of the reading I/O request is hooked to a preset operation, controller 490 will perform the preset operation to construct a writing I/O request using the read target file and send it to storage device controller 175 of destination device 150. After the completion of the writing I/O request, since the completion of the writing I/O request is hooked to a preset operation, controller 490 will perform the preset operation to mark the movement state indicator of the storage block to which the writing is completed as moved. Further, after the completion of the moving of the entire target file, controller 490 also performs a preset operation hooked to the fourth system call to release the first group of storage blocks that initially store the target file.

In this way, the metadata is stored by using the persistent memory, and the preset operations are hooked to the processing of the I/O request. Through coordinating the hooks, data can be moved directly in the kernel. In this case, there is no additional data copies or context switches between the user space and the kernel space, so the performance of the entire storage system can be improved.

Figure 9:
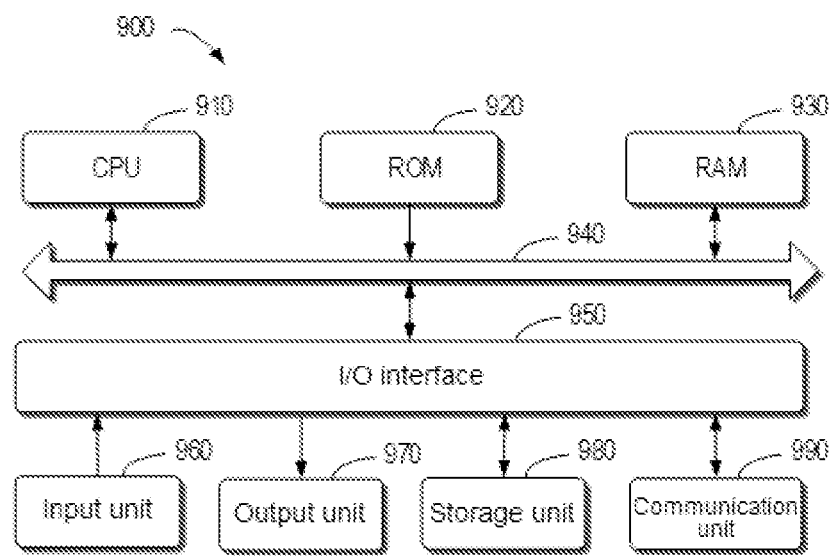
FIG. 9 illustrates a schematic block diagram of an example device that can be used to implement embodiments of the present disclosure.

FIG. 9 illustrates a schematic block diagram of example device 900 that can be used to implement the embodiments of the present disclosure. For example, controller 490 as shown in FIG. 4 can be implemented by device 900. As shown in the drawing, device 900 includes a processing unit, illustratively a central processing unit (CPU) 910, that may perform various appropriate actions and processing according to computer program instructions stored in read-only memory (ROM) 920 or computer program instructions loaded from storage unit 980 into random access memory (RAM) 930. In RAM 930, various programs and data required for the operation of storage device 900 may also be stored. CPU 910, ROM 920, and RAM 930 are connected to each other through bus 940. Input/output (I/O) interface 950 is also connected to bus 940.

Multiple components in device 900 are connected to I/O interface 950, including: input unit 960, such as a keyboard and a mouse; output unit 970, such as various types of displays and speakers; storage unit 980, such as a magnetic disk and an optical disk; and communication unit 990, such as a network card, a modem, and a wireless communication transceiver. Communication unit 990 allows device 900 to exchange information/data with other devices through a computer network such as the Internet and/or various telecommunication networks.

The various processes and processing described above, such as processes 500-800, may be executed by CPU 910. For example, in some embodiments, processes 500-800 may be implemented as a computer software program that is tangibly included in a machine-readable medium, for example, storage unit 980. In some embodiments, part or all of the computer program may be loaded and/or mounted to device 900 via ROM 920 and/or communication unit 990. When the computer program is loaded into RAM 930 and executed by CPU 910, one or more actions of processes 500-800 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. The computer-readable storage medium may be, for example, but is not limited to, an electric storage device, a magnetic storage device, an optical storage device, an electromagnetic storage device, a semiconductor storage device, or any suitable combination of the foregoing. More specific examples (a non-exhaustive list) of computer-readable storage media include: a portable computer disk, a hard disk, RAM, ROM, an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signal transmitted via electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, such as Java, Smalltalk, and C++, as well as conventional procedural programming languages, such as "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described herein with reference to flowcharts and/or block diagrams of the method, the apparatus (system), and the computer program product according to embodiments of the present disclosure. It should be understood that each block in the flowcharts and/or block diagrams and a combination of blocks in the flowcharts and/or block diagrams may be implemented by computer-readable program instructions.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions can also be loaded onto a computer, a further programmable data processing apparatus, or a further device, so that a series of operating steps can be executed on the computer, the further programmable data processing apparatus, or the further device to produce a computer-implemented process, such that the instructions executed on the computer, the further programmable data processing apparatus, or the further device can implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, and to otherwise enable persons of ordinary skill in the art to understand the various embodiments disclosed herein.

What is claimed is:

1. A method for storage management, including:
  determining at a kernel of a storage server whether a first system call related to a target file is initiated by a thread executed in the storage server, wherein the target file is a file targeted by an accessing operation executed by a client terminal with respect to a storage device;
  determining a first connection and a second connection that are associated with the target file if the first system call is initiated, wherein the first connection is a connection between the client terminal and the storage server, and the second connection is a connection between the storage server and the storage device; and
  causing the client terminal to access the target file via the first connection and the second connection.

2. The method according to claim 1, further including:
  determining whether a second system call related to starting the thread is initiated by a main thread used to manage the storage server; and
  storing an identifier of the first connection and an identifier of the thread into a storage region of the kernel if the second system call is initiated.

3. The method according to claim 2, wherein the second system call is selected from multiple idle threads and initiated by the main thread in response to receiving a request from the client terminal for establishing the first connection.

4. The method according to claim 1, further including:
  determining whether a third system call related to opening the target file is initiated by the thread; and
  storing an identifier of the target file into a storage region of the kernel if the third system call is initiated.

5. The method according to claim 4, wherein the third system call is initiated by the thread in response to receiving a request from the client terminal for accessing the target file, the request including the identifier of the target file, a size of the target file, and a position of the target file.

6. The method according to claim 1, wherein determining the first connection and the second connection includes:
  determining an identifier of the second connection based on the first system call;
  storing the identifier of the second connection into a storage region of the kernel; and
  determining the first connection and the second connection based on an identifier of the first connection and the identifier of the second connection that are stored in the storage region.

7. The method according to claim 1, wherein causing the client terminal to access the target file via the first connection and the second connection includes:
  determining whether the target file is received from the storage device via the second connection; and
  sending the target file to the client terminal via the first connection if it is determined that the target file is received.

8. The method according to claim 1, wherein causing the client terminal to access the target file via the first connection and the second connection includes:
  determining whether the target file is received from the client terminal via the first connection; and
  sending the target file to the storage device via the second connection if it is determined that the target file is received.

9. The method according to claim 1, further including:
  updating metadata, in a persistent memory, that is associated with the target file if it is determined that the client terminal accesses the target file via the first connection and the second connection.

10. The method according to claim 9, wherein the metadata includes at least one of the following:
  an identifier of the client terminal,
  a time when the target file is accessed,
  an identifier of the target file,
  a size of the target file,
  a position of the target file, and
  an index node for retrieving the target file.

11. The method according to claim 1, wherein the target file is stored in the storage device, and the method further includes:
  determining whether a fourth system call related to moving the target file from the storage device to another storage device is initiated;
  reading, if it is determined that the fourth system call is initiated, the target file from a first group of storage blocks in the storage device that are used to store the target file; and
  moving the target file to a second group of storage blocks in the other storage device.

12. The method according to claim 11, wherein the fourth system call includes:
  a type of movement,
  an identifier of the storage device,
  positions of storage blocks in the first group of storage blocks,
  an identifier of the other storage device,
  positions of storage blocks in the second group of storage blocks, and
  a size of the target file.

13. The method according to claim 11, further including:
  generating a set of records associated with the target file, wherein one record in the set of records includes: a position of a first storage block in the first group of storage blocks, a position of a second storage block corresponding to the first storage block and in the second group of storage blocks, and a movement state indicator which indicates that a part of the target file on the first storage block has not been moved to the second storage block.

14. The method according to claim 13, further including: changing, if it is determined that the part of the target file on the first storage block has been moved to the second storage block, the movement state indicator to one indicating that the part of the target file on the first storage block has been moved to the second storage block.

15. The method according to claim 11, further including: releasing the first group of storage blocks after the target file is moved to the second group of storage blocks.

16. An electronic device, including:
at least one processing unit; and
at least one memory which is coupled to the at least one processing unit and stores instructions for execution by the at least one processing unit, wherein the instructions, when executed by the at least one processing unit, cause the device to perform actions including:
determining at a kernel of a storage server whether a first system call related to a target file is initiated by a thread executed in the storage server, wherein the target file is a file targeted by an accessing operation executed by a client terminal with respect to a storage device;
determining a first connection and a second connection that are associated with the target file if the first system call is initiated, wherein the first connection is a connection between the client terminal and the storage server, and the second connection is a connection between the storage server and the storage device; and
causing the client terminal to access the target file via the first connection and the second connection.

17. The device according to claim 16, wherein the actions further include:
determining whether a second system call related to starting the thread is initiated by a main thread used to manage the storage server; and
storing an identifier of the first connection and an identifier of the thread into a storage region of the kernel if the second system call is initiated.

18. The device according to claim 17, wherein the second system call is selected from multiple idle threads and initiated by the main thread in response to receiving a request from the client terminal for establishing the first connection.

19. The device according to claim 16, wherein the actions further include:
determining whether a third system call related to opening the target file is initiated by the thread; and
storing an identifier of the target file into a storage region of the kernel if the third system call is initiated.

20. A computer program product tangibly stored on a non-transitory computer-readable medium and including machine-executable instructions, wherein the machine-executable instructions, when executed, cause a machine to perform steps of a method for storage management, the method including:
determining at a kernel of a storage server whether a first system call related to a target file is initiated by a thread executed in the storage server, wherein the target file is a file targeted by an accessing operation executed by a client terminal with respect to a storage device;
determining a first connection and a second connection that are associated with the target file if the first system call is initiated, wherein the first connection is a connection between the client terminal and the storage server, and the second connection is a connection between the storage server and the storage device; and
causing the client terminal to access the target file via the first connection and the second connection.

* * * * *